US007281457B2

(12) United States Patent
Hu

(10) Patent No.: US 7,281,457 B2
(45) Date of Patent: Oct. 16, 2007

(54) WRENCH WITH ADJUSTABLE MAXIMUM OPERATIONAL TORQUE

(76) Inventor: Bobby Hu, 8F, No. 536-1, Ta Chin Street, Taichung (TW)

( * ) Notice: Subject to any disclaimer, the term of this patent is extended or adjusted under 35 U.S.C. 154(b) by 0 days.

(21) Appl. No.: 11/306,782

(22) Filed: Jan. 11, 2006

(65) Prior Publication Data

US 2007/0062347 A1 Mar. 22, 2007

(30) Foreign Application Priority Data

Sep. 16, 2005 (TW) ............................. 94132150 A

(51) Int. Cl.
*B25B 23/143* (2006.01)
*B25B 23/159* (2006.01)
*B25B 23/14* (2006.01)
*F16D 7/06* (2006.01)

(52) U.S. Cl. ............................ 81/467; 81/478; 81/480; 464/35; 464/37

(58) Field of Classification Search .................. 81/467, 81/477, 478, 480, 481, 483; 464/35, 37, 464/41
See application file for complete search history.

(56) References Cited

U.S. PATENT DOCUMENTS

| | | | | |
|---|---|---|---|---|
| 2,013,938 | A * | 9/1935 | Williams | 73/862.44 |
| 2,601,044 | A * | 6/1952 | Mayer | 81/480 |
| 2,768,547 | A * | 10/1956 | Noell | 81/480 |
| 2,826,107 | A * | 3/1958 | Glen | 81/480 |
| 2,852,972 | A * | 9/1958 | Larson | 81/477 |
| 3,272,036 | A * | 9/1966 | Hoose | 81/477 |
| 3,651,718 | A * | 3/1972 | Thomasian | 81/480 |
| 4,238,978 | A * | 12/1980 | Leone | 81/480 |
| 6,666,117 | B2 | 12/2003 | Hu | 81/467 |
| 6,886,434 | B2 * | 5/2005 | Hu | 81/467 |

* cited by examiner

*Primary Examiner*—David B Thomas
(74) *Attorney, Agent, or Firm*—Alan Kamrath; Kamrath & Associates P.A.

(57) ABSTRACT

A wrench includes a casing having a compartment, a rod rotatably received in the casing and having an end for coupling with a drive member for driving a fastener, an adjusting member mounted in the rod, and an elastic element for retaining the rod mounted between the adjusting member and the casing. When a rotational force applied to the casing is smaller than an engaging force between the casing and the elastic element, the rod turns together with the casing for tightening the fastener. When the rotational force applied to the casing is greater than the engaging force between the casing and the elastic element, the casing slides relative to the rod without turning the fastener. The adjusting member is adjustable in position relative to the casing to thereby change the engaging force between the casing and the elastic element.

37 Claims, 13 Drawing Sheets

3-3

4-4

Replacement Sheet 6-6

12-12

WRENCH WITH ADJUSTABLE MAXIMUM OPERATIONAL TORQUE

BACKGROUND OF THE INVENTION

1. Field of the Invention

The present invention relates to a wrench with a maximum operational torque to prevent damage to the object secured by a fastener driven by the wrench.

2. Description of the Related Art

Fasteners such as screws, bolts, etc are widely used to secure objects in place. The objects might be damaged when overtightened. U.S. Pat. No. 6,666,117 to the applicant of the present application discloses a wrench comprising a rod, a retainer securely engaged with the rod to move therewith, a casing for accommodating the retainer, a ball, and an elastic element. The ball is biased by the elastic element to engage with a retaining section of the casing to thereby retain the retainer in place. When a rotational force applied to the casing is smaller than the engaging force between the retaining section of the casing and the ball, the retainer and the rod are turned to thereby turn the fastener for tightening purposes. When the rotational force applied to the casing is greater than the engaging force between the retaining section of the casing and the ball, the retainer and the rod slide and the fastener is not turned. Thus, the user will notice the sliding motion of the casing and be aware of tightening of the fastener, thereby preventing damage to the object secured by the fastener. The engaging force, which largely depends on the elastic coefficient of the elastic element, determines the fixed maximum operational torque. The fixed maximum operational torque can be altered by selecting elastic elements of different elastic coefficients.

However, the engaging force provided by the elastic element is affected by the tolerance in the diameter of the elastic element, the overall length of the elastic element, the period of time and/or temperature of heat treatment, etc. Namely, the engaging force could not be obtained to the desired precise extent. Minor adjustment of the engaging force or maximum operational torque is not allowed in this wrench as well as other conventional wrenches.

SUMMARY OF THE INVENTION

In accordance with an aspect of the present invention, a wrench comprises a casing including a compartment, a rod rotatably received in the casing and including an end adapted for coupling with a drive member for driving a fastener, an adjusting member mounted in the rod, and means for retaining the rod mounted between the adjusting member and the casing.

When a rotational force applied to the casing is smaller than an engaging force between the casing and the means for retaining the rod, the rod turns together with the casing for tightening the fastener.

When the rotational force applied to the casing is greater than the engaging force between the casing and the means for retaining the rod, the casing slides relative to the rod without turning the fastener.

The adjusting member is adjustable in position relative to the casing to thereby change the engaging force between the casing and the means for retaining the rod.

In an embodiment, the adjusting member comprises a conic end against which the means for retaining the rod abuts.

Preferably, the casing comprises a retaining section for engaging with the means for retaining the rod.

Preferably, the means for retaining the rod comprises an elastic element.

In an embodiment, the means for retaining the rod further comprises a first abutting member between the retaining section and a first end of the elastic element and a second abutting member between the adjusting member and a second end of the elastic element.

Preferably, the rod further comprises an extension extending outward from the rod and includes a receptacle for receiving the means for retaining the rod.

Preferably, the rod further comprises a longitudinal hole in communication with the receptacle. The longitudinal hole comprises a coupling section for receiving the adjusting member.

Preferably, the coupling section comprises an inner threading, and the adjusting member includes an outer threading for threading engagement with the inner threading of the coupling section.

Preferably, the adjusting member comprises a slot in an end face thereof.

Preferably, the end of the rod comprises an engaging section including a polygonal inner periphery for coupling with the drive member coupled thereto for driving the fastener.

Preferably, the longitudinal hole of the rod comprises an engaging section including a polygonal inner periphery for coupling with the drive member for driving the fastener.

In an embodiment, the compartment comprises an engaging section, and a positioning member is securely mounted in the engaging section. The positioning member comprises a retaining section for retaining the means for retaining the rod in place. The positioning member further comprises an inclined face adjacent to the retaining section.

Preferably, the compartment comprises a buffering section adjacent to the inclined face of the positioning member.

Preferably, the adjusting member comprises an end against which the means for retaining the rod abuts. A diameter of the end of the adjusting member varies along a longitudinal length of the adjusting member. The adjusting member is movable along the longitudinal length to change the engaging force between the casing and the means for retaining the rod.

In accordance with another aspect of the present invention, a wrench comprises a casing, a rod, an adjusting member, and two elastic elements. The casing includes two retaining sections. The rod is rotatably received in the casing and includes an end adapted for coupling with a drive member for driving a fastener. The rod further comprises two extensions each including a receptacle. The adjusting member is mounted in the rod and comprises an end extending into the receptacles. The elastic elements are respectively mounted in the receptacles. Each elastic element includes a first end abutting against the end of the adjusting member and a second end abutting against an associated one of the retaining sections of the casing.

When a rotational force applied to the casing is smaller than an engaging force between the retaining sections of the casing and the elastic elements, the rod turns together with the casing for tightening the fastener.

When the rotational force applied to the casing is greater than the engaging force between the retaining sections of the casing and the elastic elements, the casing slides relative to the rod without turning the fastener.

The end of the adjusting member is adjustable in position relative to the casing to thereby change the engaging force between the retaining sections of the casing and the elastic elements.

Preferably, the end of the adjusting member is conic.

Preferably, a diameter of the end of the adjusting member varies along a longitudinal length of the adjusting member. The adjusting member is movable along the longitudinal length to change the engaging force between the casing and the means for retaining the rod.

Preferably, a first abutting member is mounted between each retaining section and a first end of an associated elastic element and a second abutting member between the end of the adjusting member and a second end of the associated elastic element.

Preferably, the extensions of the rod are aligned with each other.

Preferably, the rod further comprises a longitudinal hole in communication with each receptacle. The longitudinal hole comprises a coupling section for receiving the adjusting member.

Preferably, the coupling section comprises an inner threading, and the adjusting member includes an outer threading for threading engagement with the inner threading of the coupling section.

Preferably, the adjusting member comprises a slot in an end face thereof.

Preferably, the end of the rod comprises an engaging section including a polygonal inner periphery for coupling with the drive member coupled thereto for driving the fastener.

Preferably, the longitudinal hole of the rod comprises an engaging section including a polygonal inner periphery for coupling with the drive member for driving the fastener.

Preferably, the casing comprises two compartments for respectively receiving the extensions of the rod. The retaining sections are respectively defined in the compartments. Each compartment further comprises a buffering section adjacent to an associated retaining section.

In an embodiment, each compartment comprises an engaging section. A positioning member is securely mounted in each engaging section. The retaining sections are respectively formed on the positioning members. Each positioning member further comprises an inclined face adjacent to the retaining section.

Preferably, the buffering section of each compartment is adjacent to the inclined face of an associated positioning member.

Other objectives, advantages, and novel features of the invention will become more apparent from the following detailed description when taken in conjunction with the accompanying drawings.

DETAILED DESCRIPTION OF THE PREFERRED EMBODIMENTS

Figure 1:
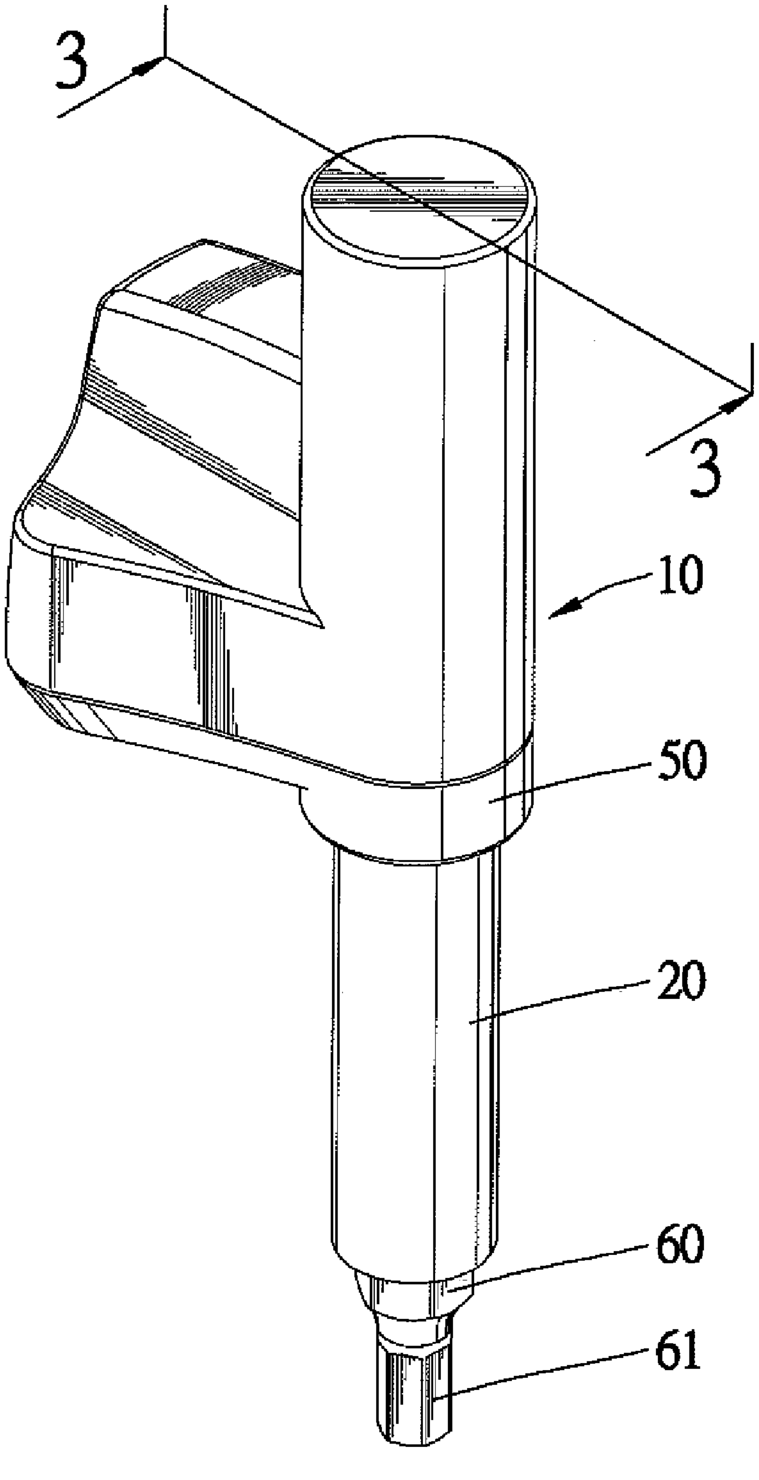
FIG. 1 is a perspective view of an embodiment of a wrench in accordance with the present invention.
Figure 2:
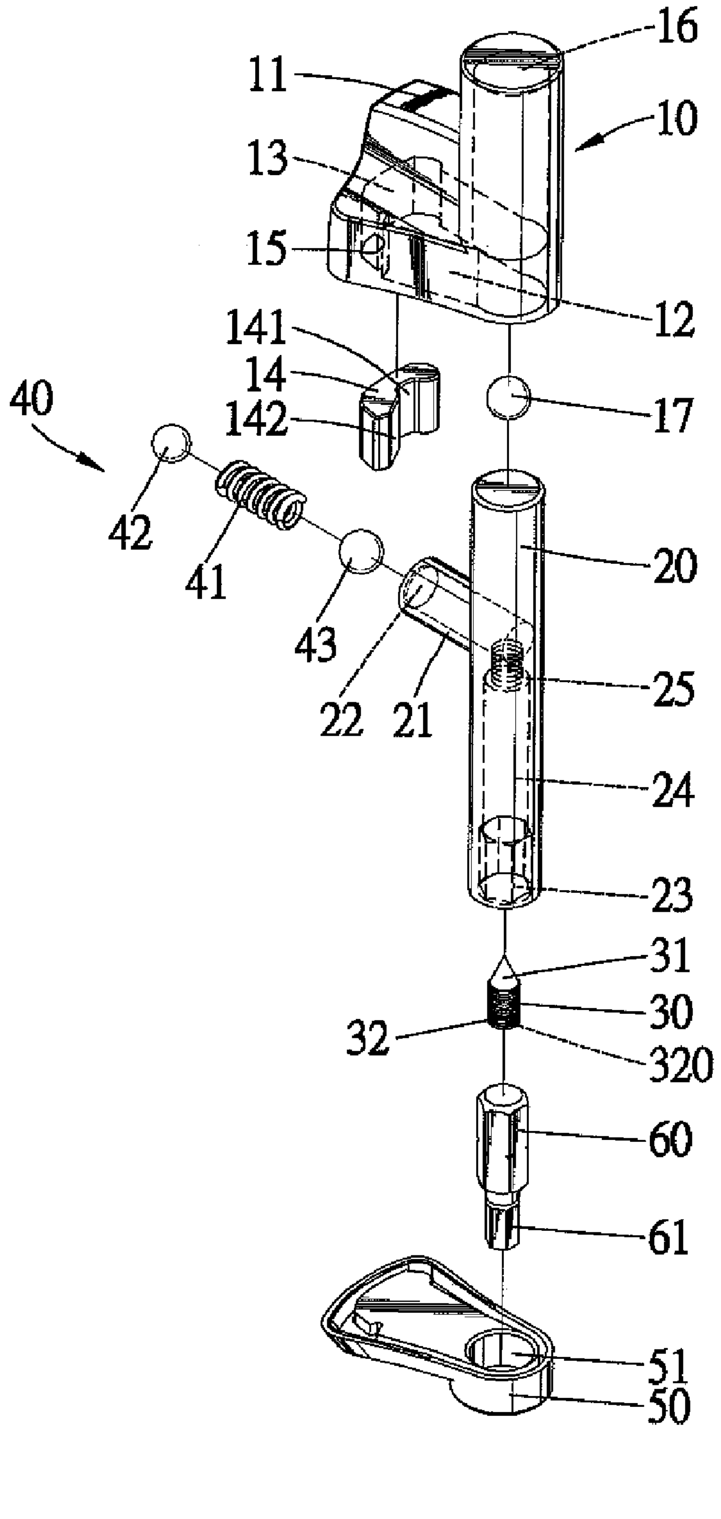
FIG. 2 is an exploded perspective view of the wrench in FIG. 1.

Referring to FIGS. 1 and 2, a wrench in accordance with the present invention comprises a casing 10, a rod 20, an adjusting member 30, and means for retaining the rod 20 (hereinafter referred to as "retaining means 40").

Figure 3:
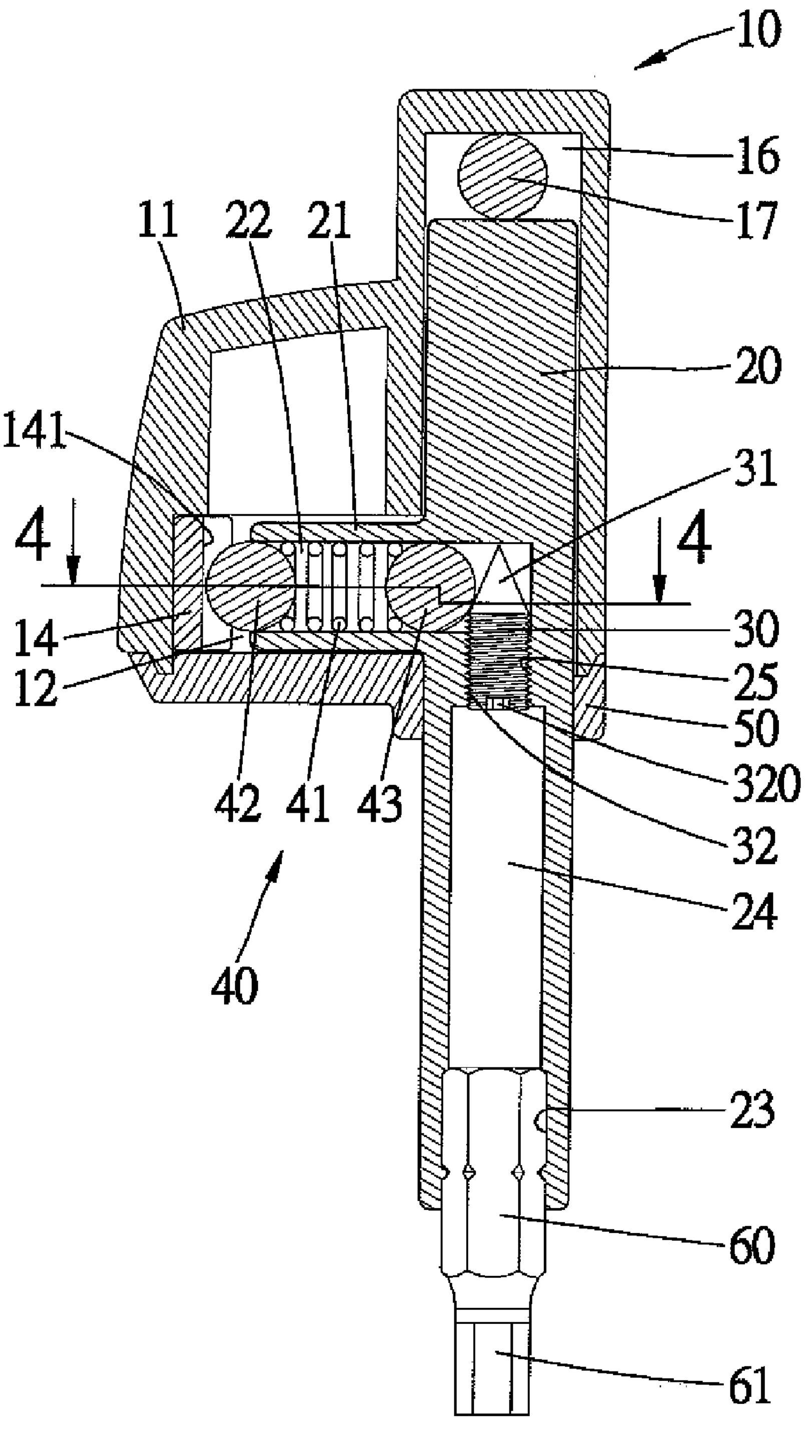
FIG. 3 is a sectional view taken along lane 3-3 in FIG. 1.

Referring to FIGS. 2 and 3, the casing 10 comprises a first end and a second end having a grip portion 11 for manual operation. The first end of the casing 10 includes a positioning hole 16 in which a ball 17 is received. A compartment 12 is defined in the casing 10 and includes an engaging section 13 for receiving a positioning member 14. The positioning member 14 may be integrally formed with a perimeter wall delimiting the compartment 12 of the casing 10.

In this embodiment, the positioning member 14 comprises a retaining section 141 and an inclined face 142 adjacent to the retaining section 141. The compartment 12 of the casing 10 includes a buffering section 15 adjacent to the inclined face 142 of the positioning member 14.

The rod 20 includes an end pivotally received in the positioning hole 16 of the casing 10, with the ball 17 located between an end face of the rod 20 and an end wall delimiting the positioning hole 16 of the casing 10 to allow smooth rotation therebetween. An extension 21 extends outward from the rod 20 and includes a receptacle 22. A longitudinal hole 24 is defined in the other end of the rod 20 and includes a coupling section 25 in communication with the receptacle 22 of the extension 21. In this embodiment, the coupling section 25 includes inner threading, and the adjusting member 30 includes outer threading for threading engagement with the inner threading of the coupling section 25. The longitudinal hole 24 of the rod 20 further includes an engaging section 23 to which a drive member 60 is engaged. The adjusting member 30 includes a first end 31 extending into the receptacle 22 of the extension 21 and a second end 32. In this embodiment, the first end 31 of the adjusting member 30 is conic, and the second end 32 of the adjusting member 30 includes a hexagonal slot 320 in an end face thereof.

The retaining means 40 is mounted in the receptacle 22 of the rod 20 and includes two ends respectively abutting against the positioning member 14 and the first end 31 of the adjusting member 30. In this embodiment, the retaining means 40 comprises a first abutting member 42 abutting against the positioning member 14, and a second abutting member 43 abutting against the first end 31 of the adjusting member 30, and an elastic element 41 mounted between the first abutting member 42 and the second abutting member 43. The first abutting member 42 and the second abutting member 43 may be balls. It is noted that the first abutting member 42 and the second abutting member 43 can be omitted if desired, with two ends of the elastic element 41 respectively abutting against the positioning member 14 and the first end 31 of the adjusting member 30.

A lid 50 is mounted to the casing 10 for closing the compartment 12. The lid 50 comprises a through-hole 51 through which the rod 20 extends.

The drive member 60 is coupled with the engaging section 23 of the longitudinal hole 24 and includes a drive portion 61 for driving a fastener or the like. In this embodiment, the engaging section 23 of the longitudinal hole 24 includes a polygonal (preferably hexagonal) inner periphery and the drive member 60 includes a polygonal (preferably hexagonal) outer periphery.

Figure 4:
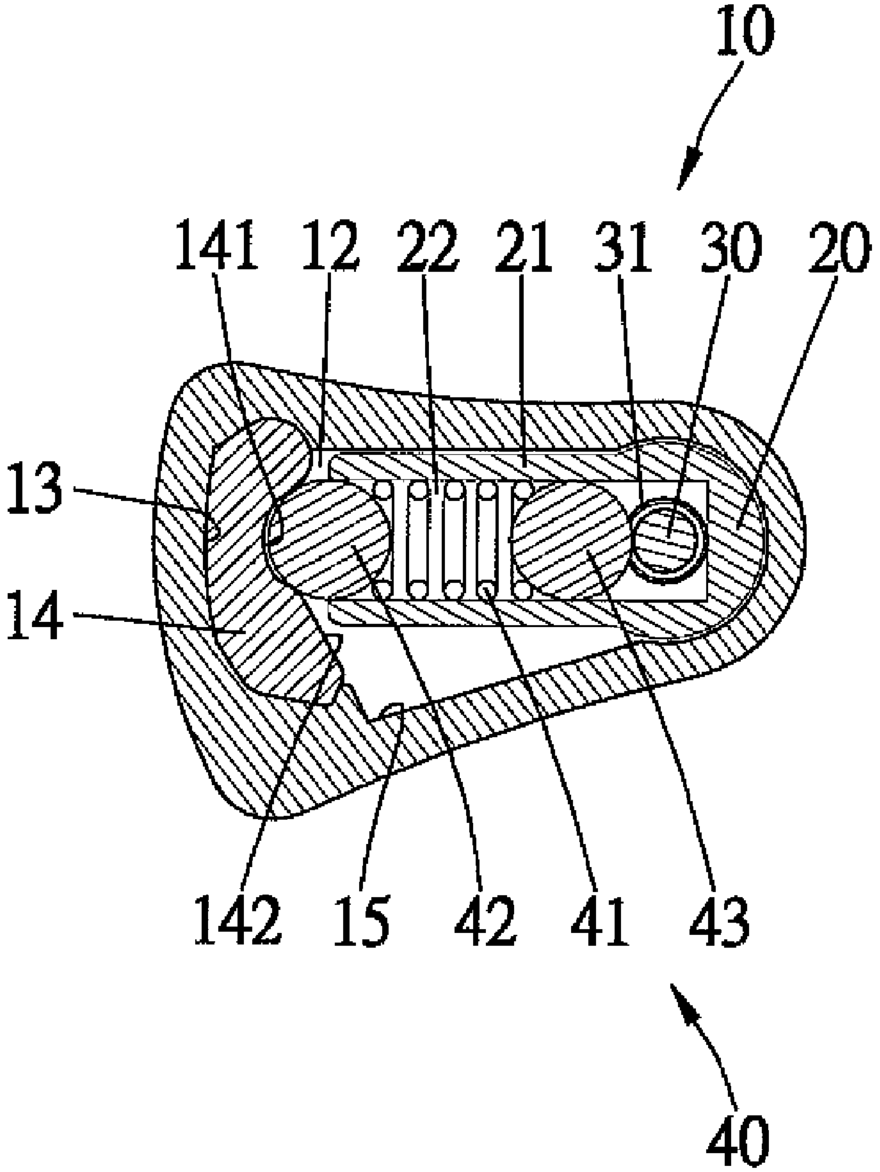
FIG. 4 is a sectional view taken along plane 4-4 in FIG. 3.

Referring to FIGS. 3 and 4, after the adjusting member 30 is mounted in the coupling section 25 of the rod 20, tests are carried out to determine whether the maximum operational torque of the wrench is equal to the standard value.

Figure 5:
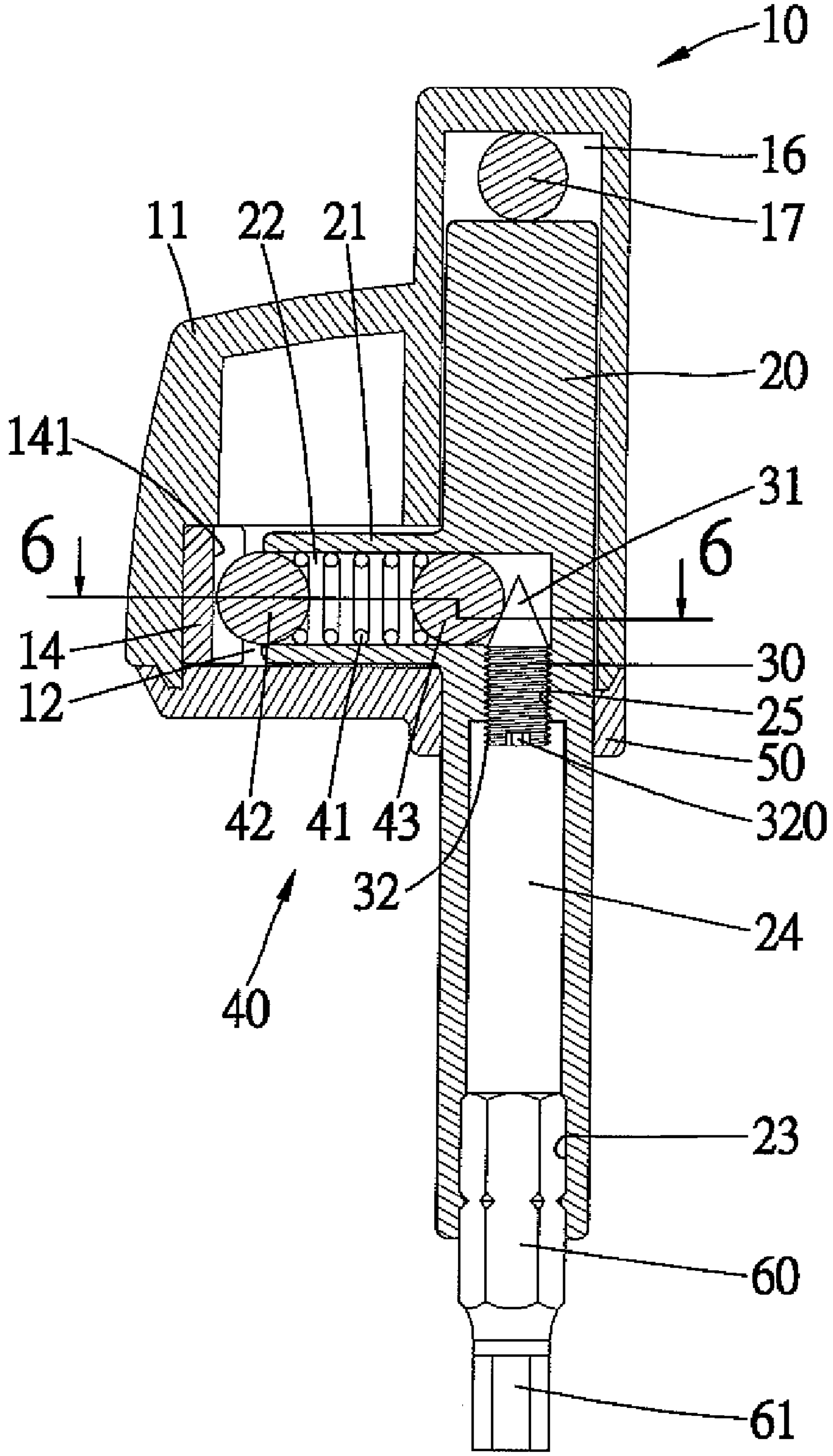
FIG. 5 is a view similar to FIG. 3, illustrating adjustment of an adjusting member.

In a case that the maximum operational torque of the wrench is greater than the standard value, the adjusting member 30 is turned so that the adjusting member 30 moves toward the other end (the lower one in FIG. 5) of the rod 20. The second abutting member 43 is moved away from the positioning member 14 to still abut against the first end 31 of the adjusting member 30 under the action of the elastic element 41, as shown in FIG. 5. The engaging force between the first abutting member 42 and the positioning member 14 is decreased. Thus, the maximum operational torque of the wrench is decreased. On the other hand, if the maximum operational torque of the wrench is lower than the standard value, the adjusting member 30 can be turned in the reverse direction to increase the maximum operational torque of the wrench. Further tests and adjustment can be carried out until the maximum operational torque of the wrench is equal to the standard value (or required value).

Figure 6:
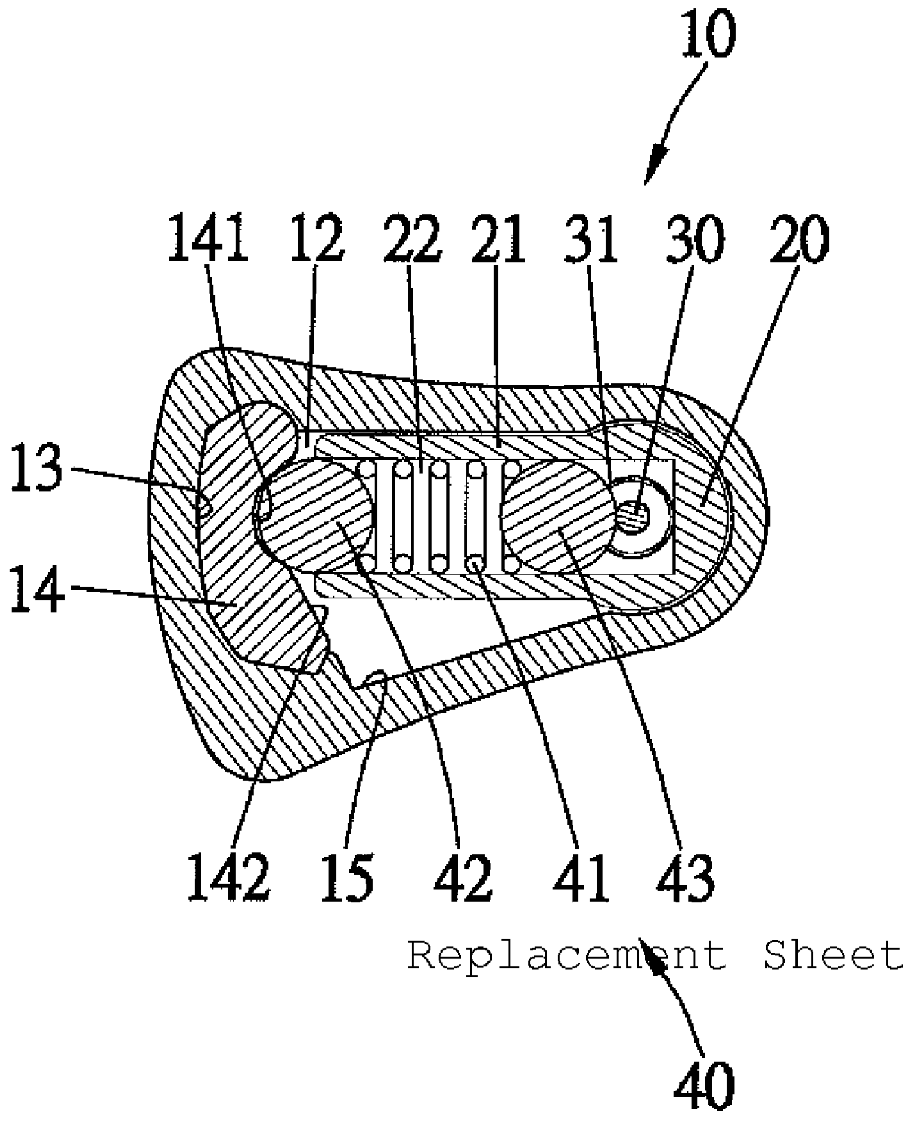
FIG. 6 is a sectional view taken along plane 6-6 in FIG. 5.

As illustrated in FIG. 6, the first abutting member 42 is normally biased by the elastic element 41 to engage with the retaining section 141 of the positioning member 14. In use, the drive portion 61 of the drive member 60 is engaged with a fastener and the casing 10 is then turned by gripping and turning the grip portion 11. When the rotational force applied to the wrench is smaller than the engaging force between the first abutting member 42 and the retaining section 141 of the positioning member 14, the rod 20 is turned together with the casing 10 to drive the fastener, as the first abutting member 42 securely abuts against the retaining section 141 of the positioning member 14.

Figure 7:
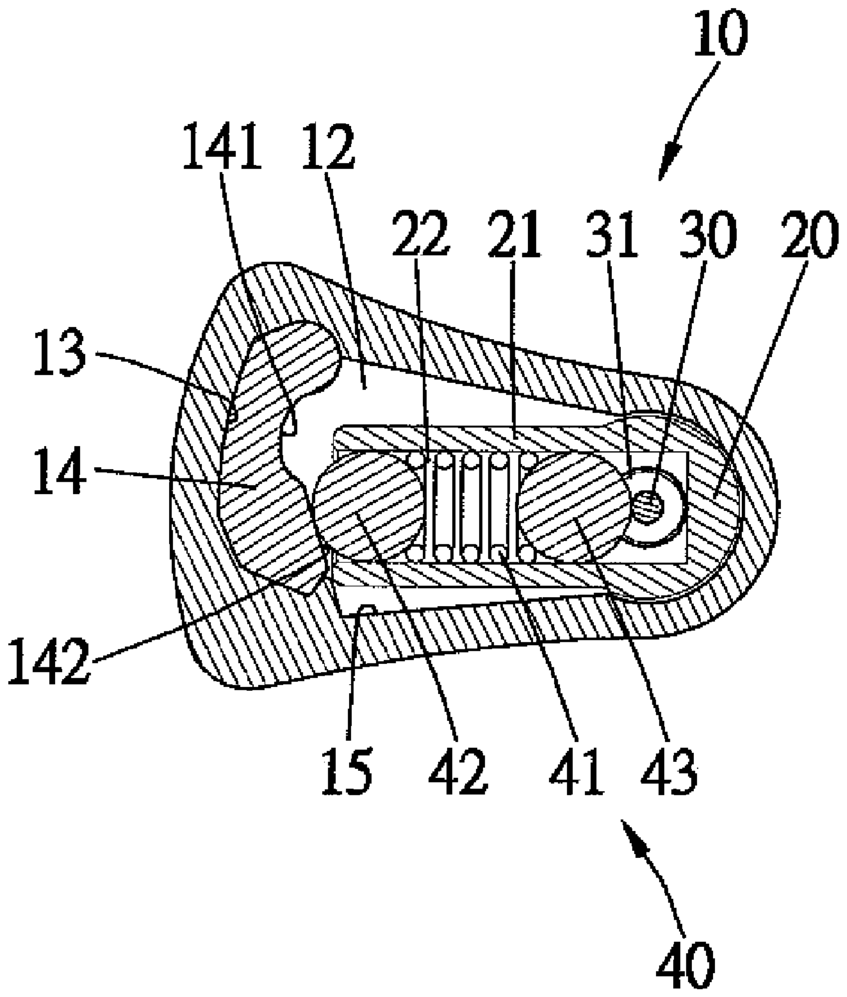
FIG. 7 is a view similar to FIG. 6, illustrating operation of the wrench.
Figure 8:
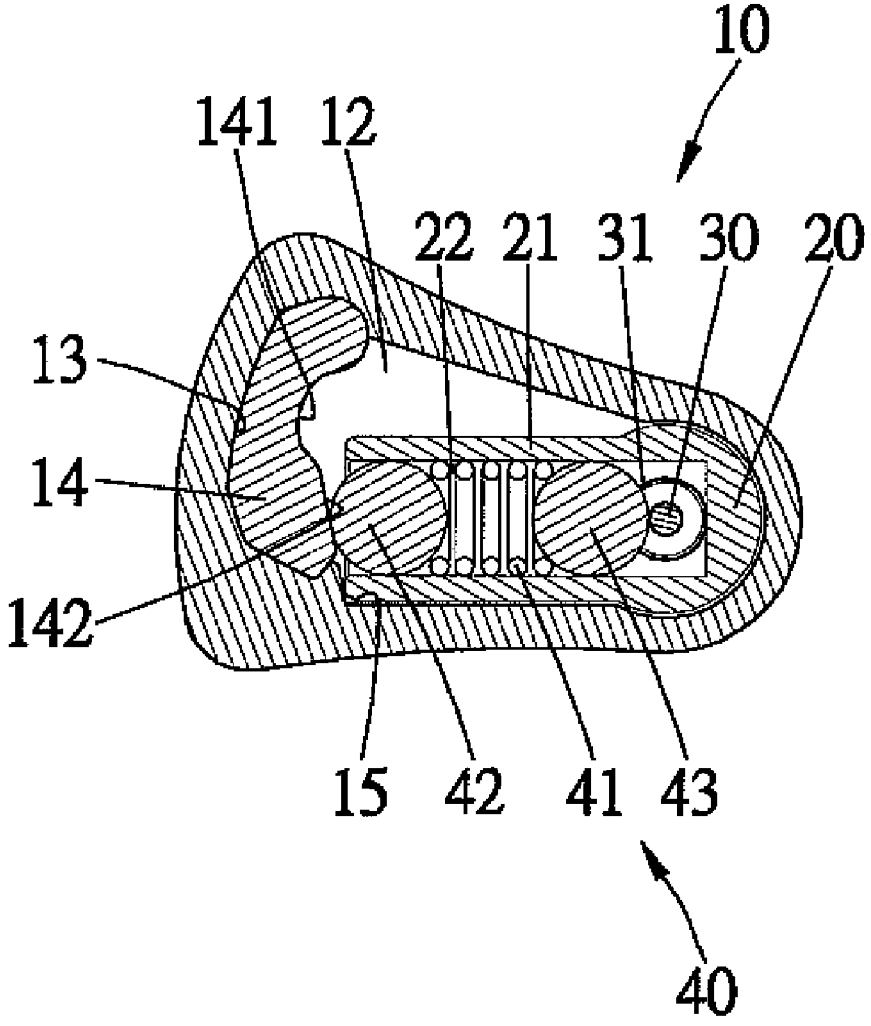
FIG. 8 is a view similar to FIG. 7, illustrating a buffering effect of the wrench.

When the rotational force applied to the wrench is greater than the engaging force between the first abutting member 42 and the retaining section 141 of the positioning member 14, the casing 10 slides relative to the rod 20 to a position shown in FIG. 7. Namely, the first abutting member 42 is disengaged from the retaining section 141 and comes in contact with the inclined face 142 of the positioning member 14. The rod 10 and the retaining means 40 are not turned. The buffering section 15 of the casing 10 provides a buffering space allowing inertial rotation of the casing 10 to prevent damage to the wrench resulting from inertial rotation, as shown in FIG. 8. The casing 10 slides along the inclined face 142 and returns to the position shown in FIG. 6 under the action of the elastic element 41 when the force is released.

When tightening a fastener, the fastener is turned by applying a torque smaller than the maximum operational torque. When the fastener is tightened, the torque required to turn the casing 10 is greater than the maximum operational torque such that the casing 10 slides, as mentioned above. The user will notice the sliding motion of the casing 10 and be aware of tightening of the fastener.

Figure 9:
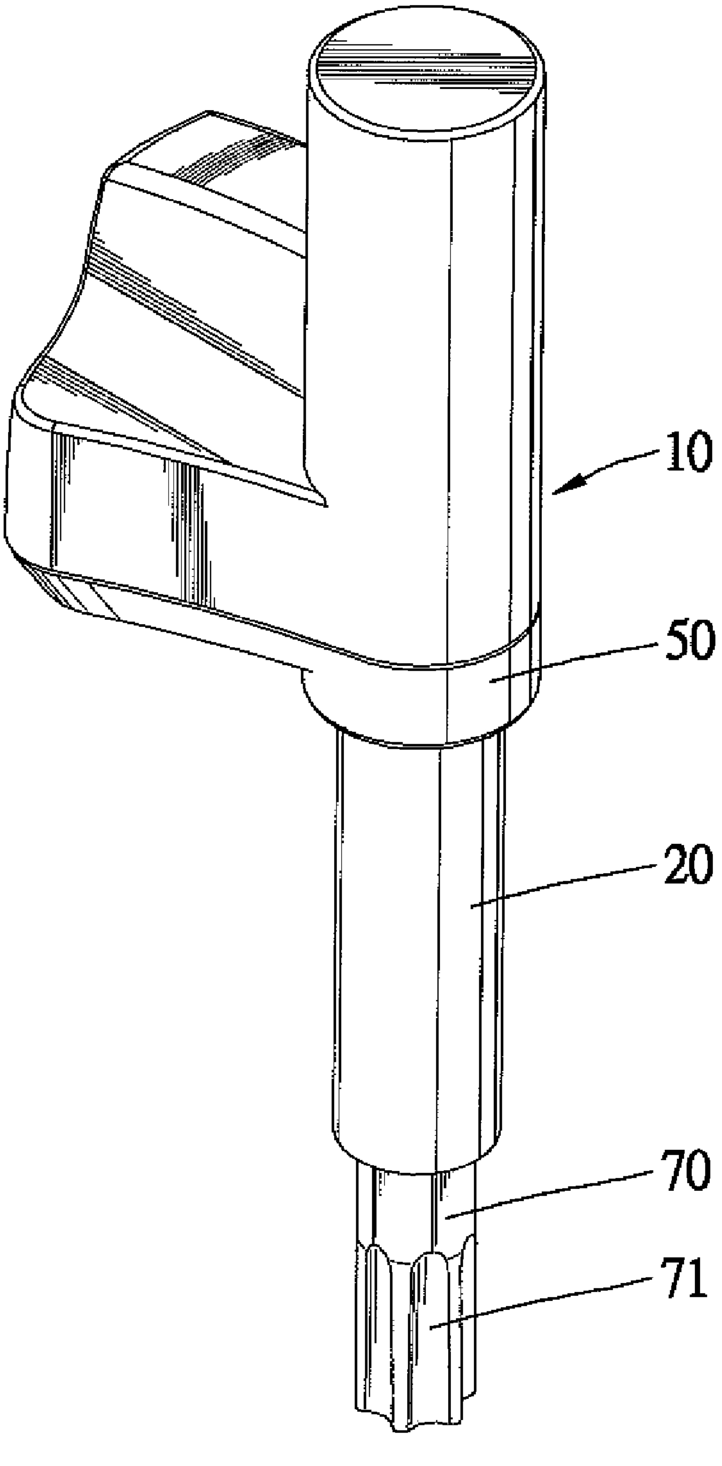
FIG. 9 is a perspective view illustrating a modified example of the wrench in FIG. 1, wherein the wrench includes a TROX type drive member.

Any type of drive member can be used with the wrench in accordance with the present invention. Referring to FIG. 9, the drive member may be a TROX type wrench 70 with a TROX type drive portion 71.

Figure 10:
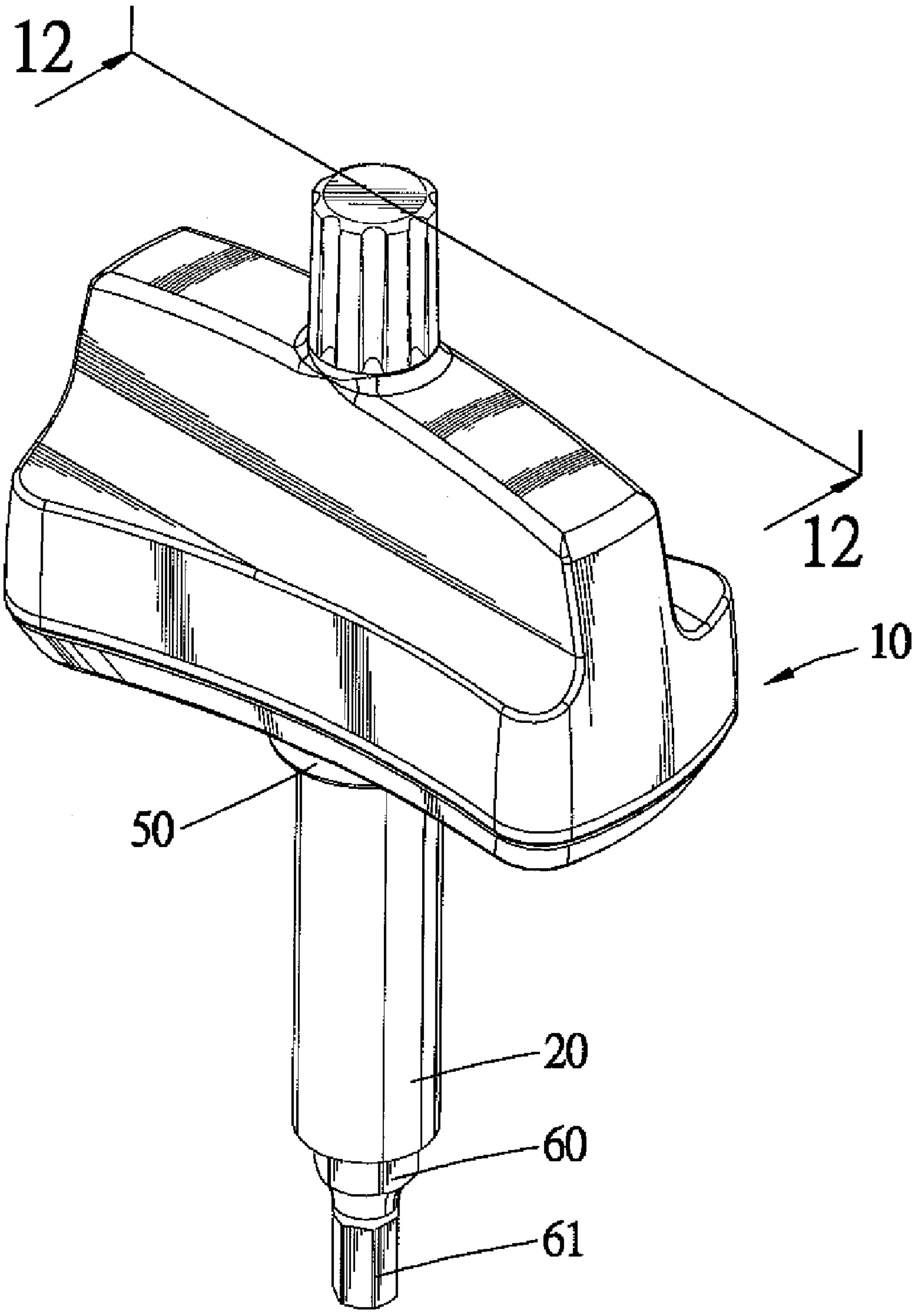
FIG. 10 is a perspective view illustrating a modified embodiment of the wrench in accordance with the present invention.
Figure 11:
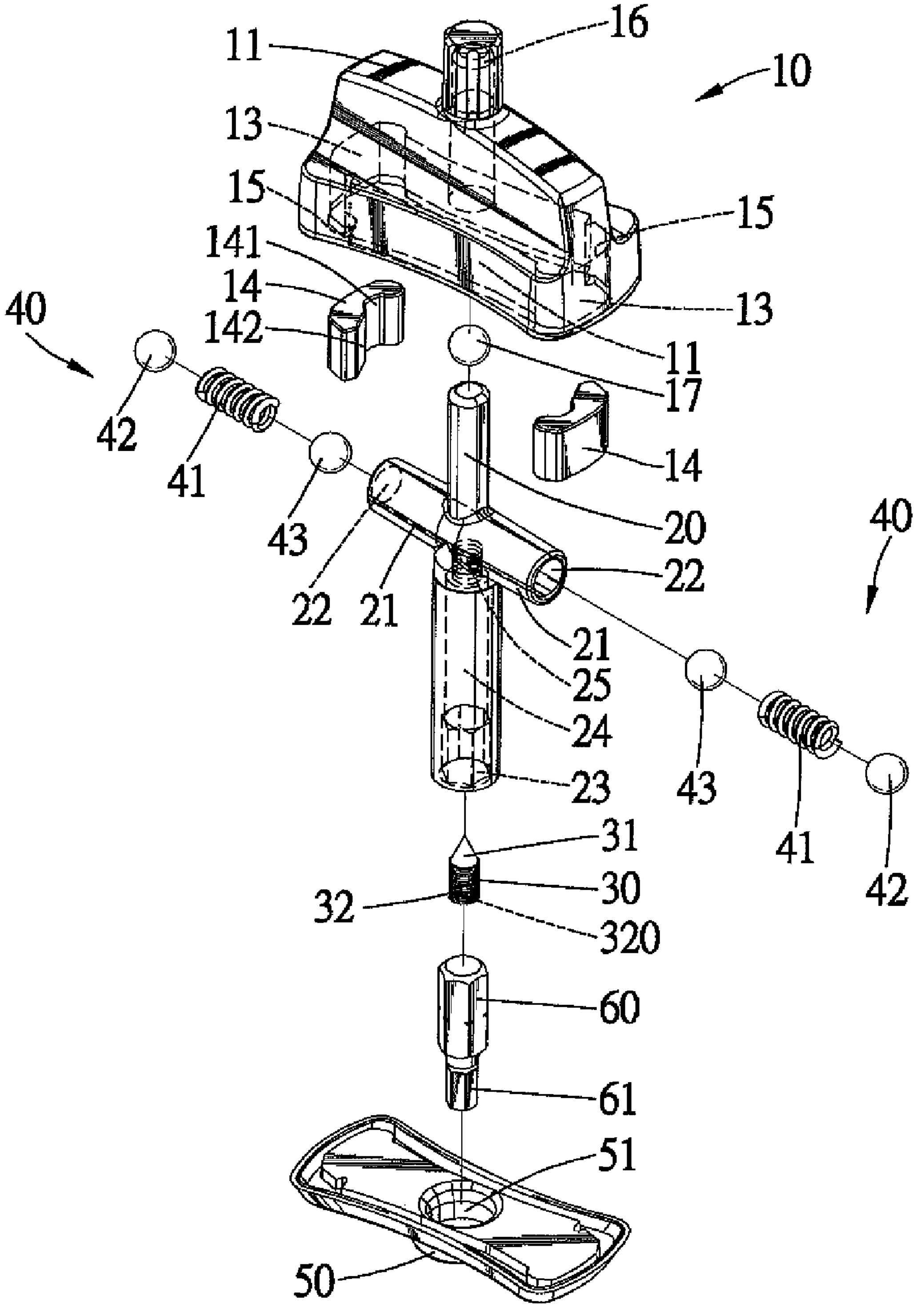
FIG. 11 is an exploded perspective view of the wrench in FIG. 10.
Figure 12:
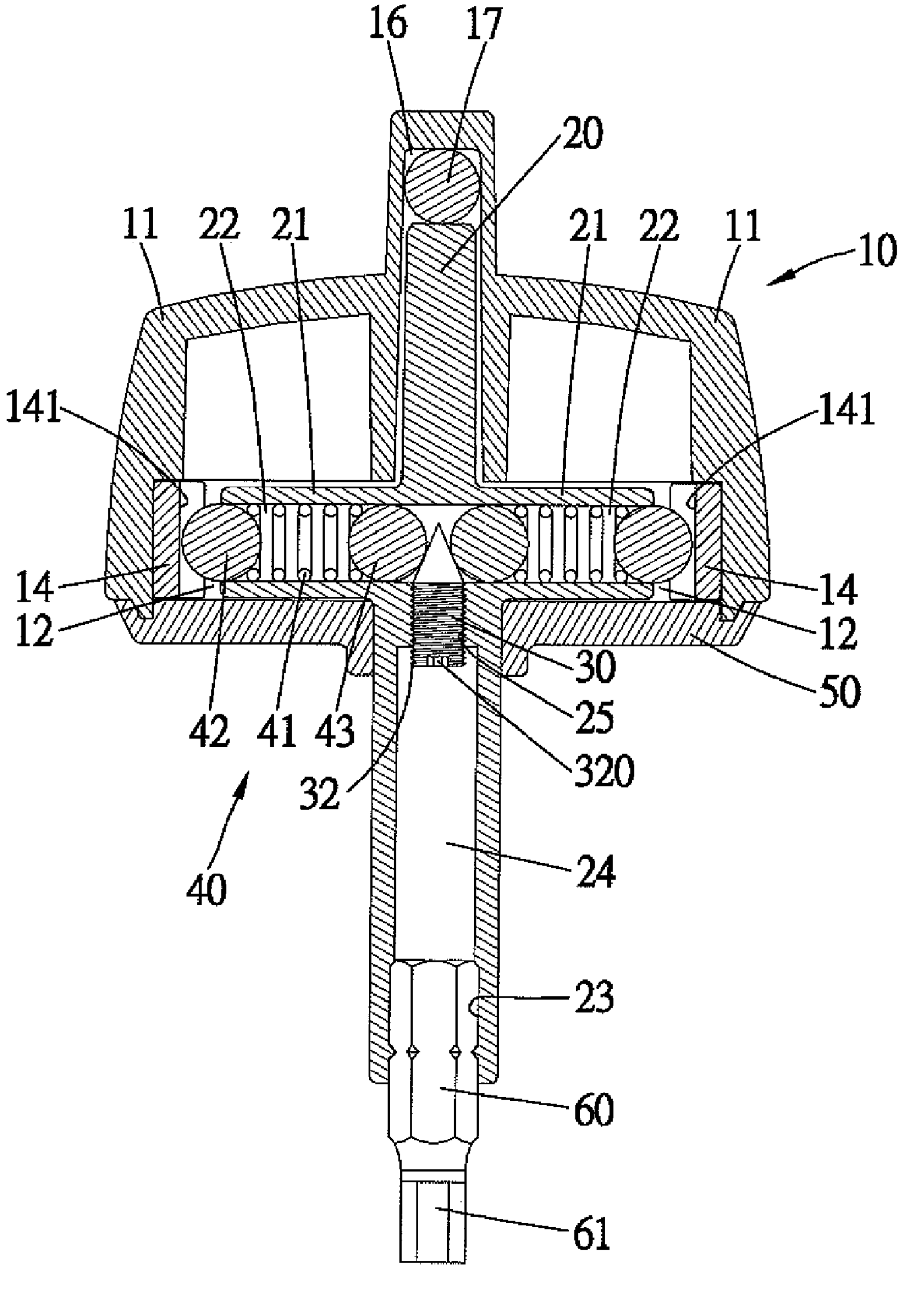
FIG. 12 is a sectional view taken along plane 12-12 in FIG. 10.

FIGS. 10 through 12 illustrate a modified embodiment of the wrench in accordance with the present invention. In this embodiment, the casing 10 includes two side sections each having a grip portion 11 for manual operation. Between the side sections of the casing 10 is an intermediate portion that includes a positioning hole 16 in which a ball 17 is received. A compartment 12 is defined in each side section of the casing 10 and includes an engaging section 13 for receiving a positioning member 14. Each positioning member 14 may be integrally formed with a perimeter wall delimiting the associated compartment 12 of the casing 10.

In this embodiment, each positioning member 14 comprises a retaining section 141 and an inclined face 142 adjacent to the retaining section 141. Each compartment 12 of the casing 10 includes a buffering section 15 adjacent to the inclined face 142 of the associated positioning member 14.

A rod 20 includes an end pivotally received in the positioning hole 16 of the casing 10, with the ball 17 located between an end face of the rod 20 and an end wall delimiting the positioning hole 16 of the casing 10 to allow smooth rotation therebetween. Two extensions 21 extend outward from the rod 20 and are preferably aligned with each other. Each extension 21 includes a receptacle 22. Preferably, the receptacles 22 of the extensions 21 are in communication with each other. A longitudinal hole 24 is defined in the other end of the rod 20 and includes a coupling section 25 in communication with the receptacle 22 of each extension 21. In this embodiment, the coupling section 25 includes inner threading, and an adjusting member 30 includes outer threading for threading engagement with the inner threading of the coupling section 25. The longitudinal hole 24 of the rod 20 further includes an engaging section 23 to which a drive member 60 is engaged. The adjusting member 30 includes a first end 31 extending into the receptacle 22 of each extension 21 and a second end 32. In this embodiment, the first end 31 of the adjusting member 30 is conic, and the second end 32 of the adjusting member 30 includes a hexagonal slot 320 in an end face thereof. [Para 69]A retaining means 40 is mounted in each receptacle 22 and includes an elastic element 41 and first and second abutting members 42 and 43 on both ends of the elastic element 41. As illustrated in FIG. 12, each first abutting member 42 abuts against the associated positioning member 14, and a second abutting member 43 abutting against the first end 31 of the adjusting member 30, and an elastic element 41 mounted between the first abutting member 42 and the second abutting member 43. The first abutting member 42 and the second abutting member 43 may be balls. It is noted that the first abutting member 42 and the second abutting member 43 can be omitted if desired, with two ends of each elastic element 41 respectively abutting against the associated positioning member 14 and the first end 31 of the adjusting member 30.

After the adjusting member 30 is mounted in the coupling section 25 of the rod 20, tests are carried out to determine whether the maximum operational torque of the wrench is equal to the standard value.

In a case that the maximum operational torque of the wrench is greater than the standard value, the adjusting member 30 is turned so that the adjusting member 30 moves toward the other end (the lower one in FIG. 12) of the rod 20. Each second abutting member 43 is moved to still abut against the first end 31 of the adjusting member 30 under the action of the associated elastic element 41. The engaging force between each first abutting member 42 and the associated positioning member 14 is decreased. Thus, the maximum operational torque of the wrench is decreased. On the other hand, if the maximum operational torque of the wrench is lower than the standard value, the adjusting member 30 can be turned in the reverse direction to increase the maximum operational torque of the wrench. Further tests and adjustment can be carried out until the maximum operational torque of the wrench is equal to the standard value (or required value).

Referring to FIG. 12, each first abutting member 42 is normally biased by the associated elastic element 41 to engage with the retaining section 141 of the associated positioning member 14. In use, the drive portion 61 of the drive member 60 is engaged with a fastener, and the casing 10 is then turned by gripping and turning the grip portions 11. When the rotational force applied to the wrench is smaller than the engaging force between first abutting members 42 and the retaining sections 141 of the positioning members 14, the rod 20 is turned together with the casing 10 to drive the fastener, as the first abutting members 42 securely abut against the retaining sections 141 of the positioning members 14, respectively.

When the rotational force applied to the wrench is greater than the engaging force between the first abutting members 42 and the retaining section 141 of the positioning members 14, the casing 10 slides relative to the rod 20. Namely, the first abutting members 42 are disengaged from the retaining sections 141 and come in contact with the inclined faces 142 of the positioning members 14. The rod 10 and the retaining means 40 are not turned. The buffering sections 15 of the casing 10 provide buffering spaces allowing inertial rotation of the casing 10 to prevent damage to the wrench resulting from inertial rotation. The casing 10 slides along the inclined faces 142 and returns to the position shown in FIG. 12 under the action of the elastic elements 41 when the force is released.

When tightening a fastener, the fastener is turned by applying a torque smaller than the maximum operational torque. When the fastener is tightened, the torque required to turn the casing 10 is greater than the maximum operational torque such that the casing 10 slides, as mentioned above. The user will notice the sliding motion of the casing 10 and be aware of tightening of the fastener.

Figure 13:
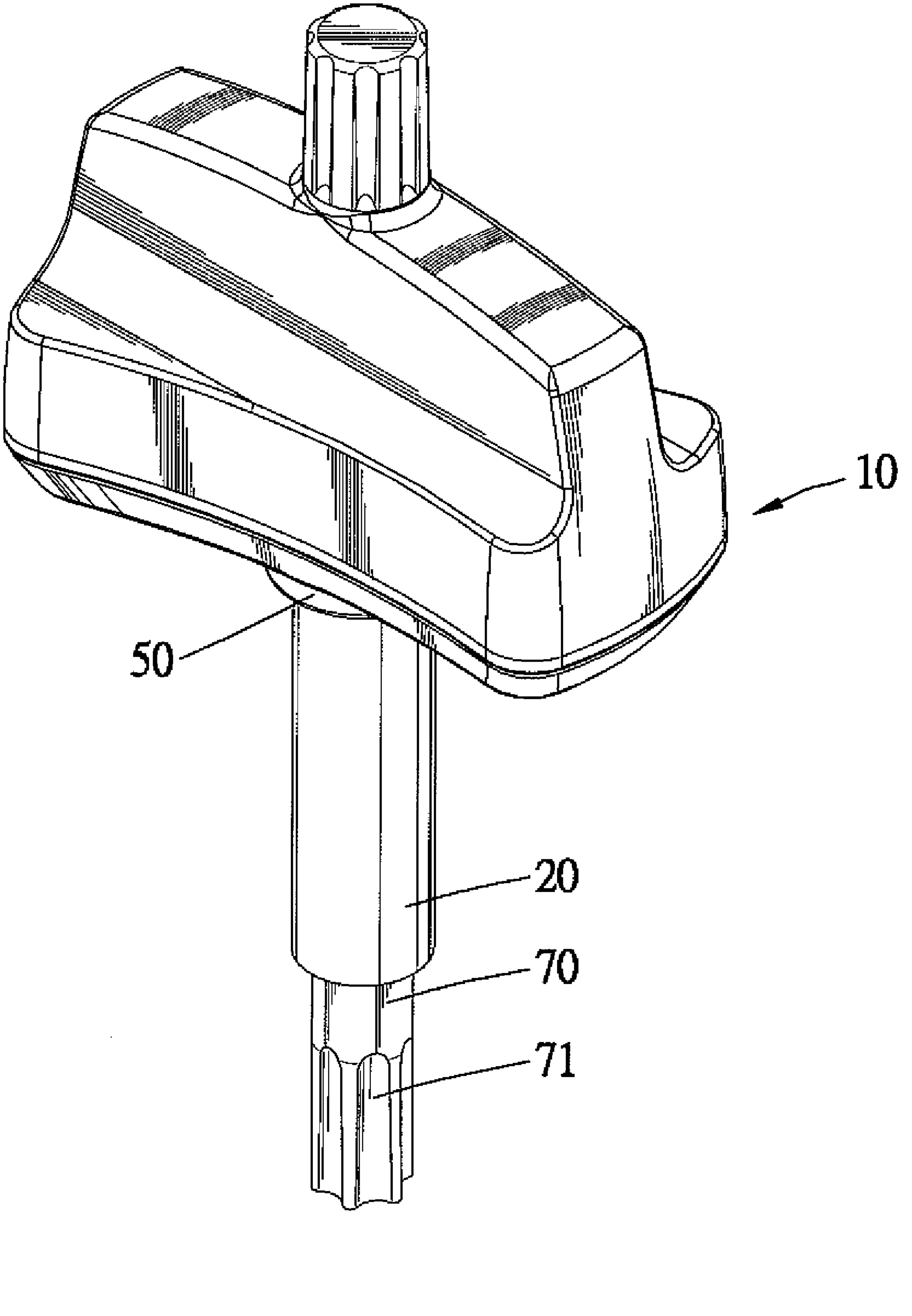
FIG. 13 is a perspective view illustrating a modified example of the wrench in FIG. 10, wherein the wrench includes a TROX type drive member.

Referring to FIG. 13, the drive member may be a TROX type wrench 70 with a TROX type drive portion 71.

As apparent from the foregoing, the wrench in accordance with the present invention may reach the standard value after minor adjustment. The wrench has a simple structure and thus has a low cost, and the cost of the wrench can be further cut by integral formation of the positioning member(s) 14 and the casing 10. Further, the inclined face(s) 142 of the positioning member(s) 14 provide(s) an automatic returning effect for the wrench. Further, the wrench can be used with different types of drive members.

Although specific embodiments have been illustrated and described, numerous modifications and variations are still possible without departing from the essence of the invention. The scope of the invention is limited by the accompanying claims.

What is claimed is:

1. A wrench comprising:

a casing comprising a compartment;

a rod rotatably received in the casing, the rod comprising an end adapted for coupling with a drive member for driving a fastener;

an adjusting member mounted in the rod; and means for retaining the rod mounted between the adjusting member and the casing;

wherein when a rotational force applied to the casing is smaller than an engaging force between the casing and said means for retaining the rod, the rod turns together with the casing for tightening the fastener;

wherein when the rotational force applied to the casing is greater than the engaging force between the casing and said means for retaining the rod, the casing slides relative to the rod without turning the fastener; and wherein the adjusting member is adjustable in position relative to the casing to thereby change the engaging force between the casing and said means for retaining the rod, with the casing comprising a retaining section for engaging with said means for retaining the rod, with means for retaining the rod comprising an elastic element.

2. The wrench as claimed in claim 1, with said means for retaining the rod further comprising an abutting member between the retaining section and an end of the elastic element.

3. The wrench as claimed in claim 1, with said means for retaining the rod further comprising an abutting member between the adjusting member and an end of the elastic element.

4. The wrench as claimed in claim 1, with said means for retaining the rod further comprising a first abutting member between the retaining section and a first end of the elastic element and a second abutting member between the adjusting member and a second end of the elastic element.

5. A wrench comprising:

a casing comprising a compartment;

a rod rotatably received in the casing, the rod comprising an end adapted for coupling with a drive member for driving a fastener;

an adjusting member mounted in the rod; and means for retaining the rod mounted between the adjusting member and the casing;

wherein when a rotational force applied to the casing is smaller than an engaging force between the casing and said means for retaining the rod, the rod turns together with the casing for tightening the fastener;

wherein when the rotational force applied to the casing is treater than the engaging force between the casing and said means for retaining the rod, the casing slides relative to the rod without turning the fastener; and wherein the adjusting member is adjustable in position relative to the casing to thereby change the engaging force between the casing and said means for retaining the rod, with the rod further comprising an extension extending outward from the rod and including a receptacle for receiving said means for retaining the rod.

6. The wrench as claimed in claim 5, with the rod further comprising a longitudinal hole in communication with the receptacle, the longitudinal hole comprising a coupling section for receiving the adjusting member.

7. The wrench as claimed in claim 6, with the coupling section comprising an inner threading and with the adjusting member including an outer threading for threading engagement with the inner threading of the coupling section.

8. The wrench as claimed in claim 7, with the adjusting member comprising a conic end extending into the receptacle.

9. The wrench as claimed in claim 8, with the adjusting member comprising a slot in an end face thereof.

10. The wrench as claimed in claim 7, with the longitudinal hole comprising an engaging section for coupling with a drive member.

11. A wrench comprising:

a casing comprising a compartment;

a rod rotatably received in the casing, the rod comprising an end adapted for coupling with a drive member for driving a fastener;

an adjusting member mounted in the rod; and means for retaining the rod mounted between the adjusting member and the casing;

wherein when a rotational force applied to the casing is smaller than an engaging force between the casing and said means for retaining the rod, the rod turns together with the casing for tightening the fastener;

wherein when the rotational force applied to the casing is greater than the engaging force between the casing and said means for retaining the rod, the casing slides relative to the rod without turning the fastener; and wherein the adjusting member is adjustable in position relative to the casing to thereby change the engaging force between the casing and said means for retaining the rod, with the casing comprising a retaining section for engaging with said means for retaining the rod, with the compartment comprising a buffering section adjacent to the retaining section.

12. A wrench comprising:

a casing comprising a compartment;

a rod rotatably received in the casing, the rod comprising an end adapted for coupling with a drive member for driving a fastener;

an adjusting member mounted in the rod; and means for retaining the rod mounted between the adjusting member and the casing;

wherein when a rotational force applied to the casing is smaller than an engaging force between the casing and said means for retaining the rod, the rod turns together with the casing for tightening the fastener;

wherein when the rotational force applied to the casing is greater than the engaging force between the casing and said means for retaining the rod, the casing slides relative to the rod without turning the fastener; and wherein the adjusting member is adjustable in position relative to the casing to thereby change the engaging force between the casing and said means for retaining the rod, with the compartment comprising an engaging section, with a positioning member securely mounted in the engaging section, the positioning member comprising a retaining section for retaining said means for retaining the rod in place, the positioning member further comprising an inclined face adjacent to the retaining section.

13. The wrench as claimed in claim 12, with the compartment comprising a buffering section adjacent to the inclined face of the positioning member.

14. The wrench as claimed in claim 12, with the adjusting member comprising an end against which said means for retaining the rod abuts, a diameter of the end of the adjusting member varying along a longitudinal length of the adjusting member, the adjusting member being movable along the longitudinal length to change the engaging force between the casing and said means for retaining the rod.

15. A wrench comprising:

a casing comprising two retaining sections;

a rod rotatably received in the casing, the rod comprising an end adapted for engaging coupling with a drive member for driving a fastener, the rod further comprising two extensions, each said extension comprising a receptacle;

an adjusting member mounted in the rod and comprising an end extending into the receptacles; and two elastic elements respectively mounted in the receptacles, each said elastic element including a first end abutting against the end of the adjusting member and a second end abutting against an associated one of the retaining sections of the casing;

wherein when a rotational force applied to the casing is smaller than an engaging force between the retaining sections of the casing and the elastic elements, the rod turns together with the casing far tightening the fastener;

wherein when the rotational force applied to the casing is greater than the engaging force between the retaining sections of the casing and the elastic elements, the casing slides relative to the rod without turning the fastener; and wherein the end of the adjusting member is adjustable in position relative to the casing to thereby change the engaging force between the retaining sections of the casing and the elastic elements.

16. The wrench as claimed in claim 15, with the end of the adjusting member being conic.

17. The wrench as claimed in claim 15, with a diameter of the end of the adjusting member varying along a longitudinal length of the adjusting member, the adjusting member being movable along the longitudinal length to change the engaging force between the casing and said means for retaining the rod.

18. The wrench as claimed in claim 15, with the wrench further comprising an abutting member between one of the retaining sections and an end of an associated one of the elastic elements.

19. The wrench as claimed in claim 15, with the wrench further comprising an abutting member between the adjusting member and an end of one of the elastic elements.

20. The wrench as claimed in claim 15, with the wrench further comprising a first abutting member between each said retaining section and a first end of an associated one of the elastic elements and a second abutting member between the end of the adjusting member and a second end of the associated one of the elastic elements.

21. The wrench as claimed in claim 15, with the extensions of the rod being aligned with each other.

22. The wrench as claimed in claim 15, with the rod further comprising a longitudinal hole in communication with each said receptacle, the longitudinal hole comprising a coupling section for receiving the adjusting member.

23. The wrench as claimed in claim 22, with the coupling section comprising an inner threading and with the adjusting member including an outer threading for threading engagement with the inner threading of the coupling section.

24. The wrench as claimed in claim 23, with the adjusting member comprising a slot in an end face thereof.

25. The wrench as claimed in claim 15, with the casing comprising two compartments for respectively receiving the extensions of the rod, the retaining sections being respectively defined in said compartments, each said compartment further comprising a buffering section adjacent to an associated one of the retaining sections.

26. The wrench as claimed in claim 25, with each said compartment comprising an engaging section, with a positioning member being securely mounted in each said engaging section, the retaining sections being respectively formed on the positioning members, each said positioning member further comprising an inclined face adjacent to the retaining section.

27. The wrench as claimed in claim 26, with the buffering section of each said compartment being adjacent to the inclined face of an associated one of the positioning members.

28. The wrench as claimed in claim 27, with a diameter of the end of the adjusting member varying along a longitudinal length of the adjusting member, the adjusting member being movable along the longitudinal length to change the engaging force between the casing and the elastic elements.

29. The wrench as claimed in claim 15, with the rod further comprising a drive member coupled thereto for driving fasteners.

30. The wrench as claimed in claim 29, with the longitudinal hole comprising an engaging section for coupling with the drive member.

31. A wrench comprising:

a casing comprising a compartment;

a rod rotatably received in the casing, the rod comprising an end adapted for coupling with a drive member for driving a fastener;

a retaining means mounted between the rod and the casing, the casing comprising a retaining section for engaging with the retaining means for retaining the rod, the retaining means further comprising an elastic element; and a positioning member securely mounted in the compartment, the positioning member further comprising an inclined face adjacent to the retaining section;

wherein when a rotational force applied to the casing is smaller than an engaging force between the casing and the retaining means, the rod turns together with the casing for tightening the fastener; and wherein when the rotational force applied to the casing is greater than the engaging force between the casing and the retaining means, the casing slides relative to the rod without turning the fastener, with the retaining means sliding on the inclined face of the positioning member to absorb the rotational force, thereby preventing said casing from coming into contact with the retaining means.

32. The wrench as claimed in claim 31, with the wrench further comprising an adjusting member mounted in the rod, with the adjusting member comprising a conic end against which said retaining means abuts.

33. The wrench as claimed in claim 31, with the casing comprising a retaining section for engaging with said retaining means abuts.

34. The wrench as claimed in claim 31, with the compartment comprising a buffering section adjacent to the inclined face of the positioning member.

35. The wrench as claimed in claim 31, with the retaining means comprising an elastic element and an abutting member between the retaining section and an end of the elastic element, with the elastic element returning the abutting member to the retaining section along the inclined face.

36. The wrench as claimed in claim 31, with the rod further comprising an extension extending outward from the rod, the extension including a receptacle for receiving the retaining means.

37. The wrench as claimed in claim 31, with the wrench further comprising and adjusting member mounted in the rod, with the retaining means being mounted between the adjusting member and the casing, and with the adjusting member being adjustable in position relative to the casing to thereby change the engaging force between the casing and the retaining means.

* * * * *